United States Patent

[11] 3,540,682

| [72] | Inventors | Charles G. Dibble; David Furguson Howard, Cincinnati, Ohio |
|---|---|---|
| [21] | Appl. No. | 416,680 |
| [22] | Filed | Dec. 2, 1964 |
| [45] | Patented | Nov. 17, 1970 |
| [73] | Assignee | General Electric Company a corporation of New York |

[54] TURBOFAN TYPE ENGINE FRAME AND SUPPORT SYSTEM
1 Claim, 6 Drawing Figs.

[52] U.S. Cl................................................. 244/53, 60/226, 60/39.31
[51] Int. Cl.................................................. B64b 1/24
[50] Field of Search............................................ 60/35, 6, 226; 244/53

[56] References Cited
UNITED STATES PATENTS

| 3,095,166 | 6/1923 | Briggs.......................... | 244/53 |
| 3,299,639 | 1/1967 | Lagelbauer..................... | 60/226 |

*Primary Examiner* — Samuel Feinberg
*Attorneys* — Derek P. Lawrence, Erwin F. Berrier, Jr., Oscar B. Waddell, Melvin M. Goldenberg, Lee H. Sachs and Frank L. Neuhauser

ABSTRACT: This invention relates generally to turbofan type fluid-flow machine structures and, more specifically, to an improved lightweight frame and support system for an improved type of front mounted axial-flow compressor for use in a turbofan type engine.

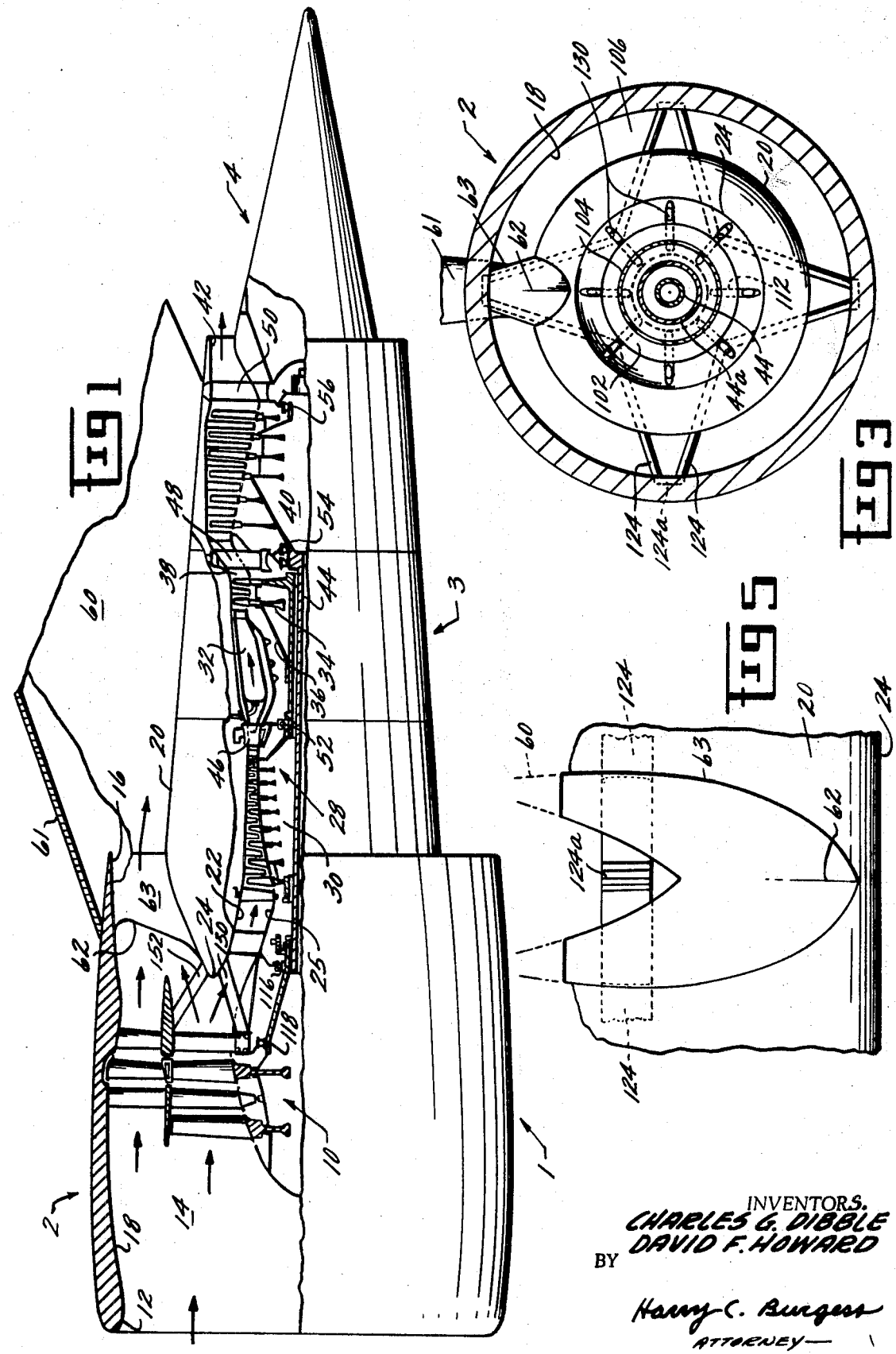

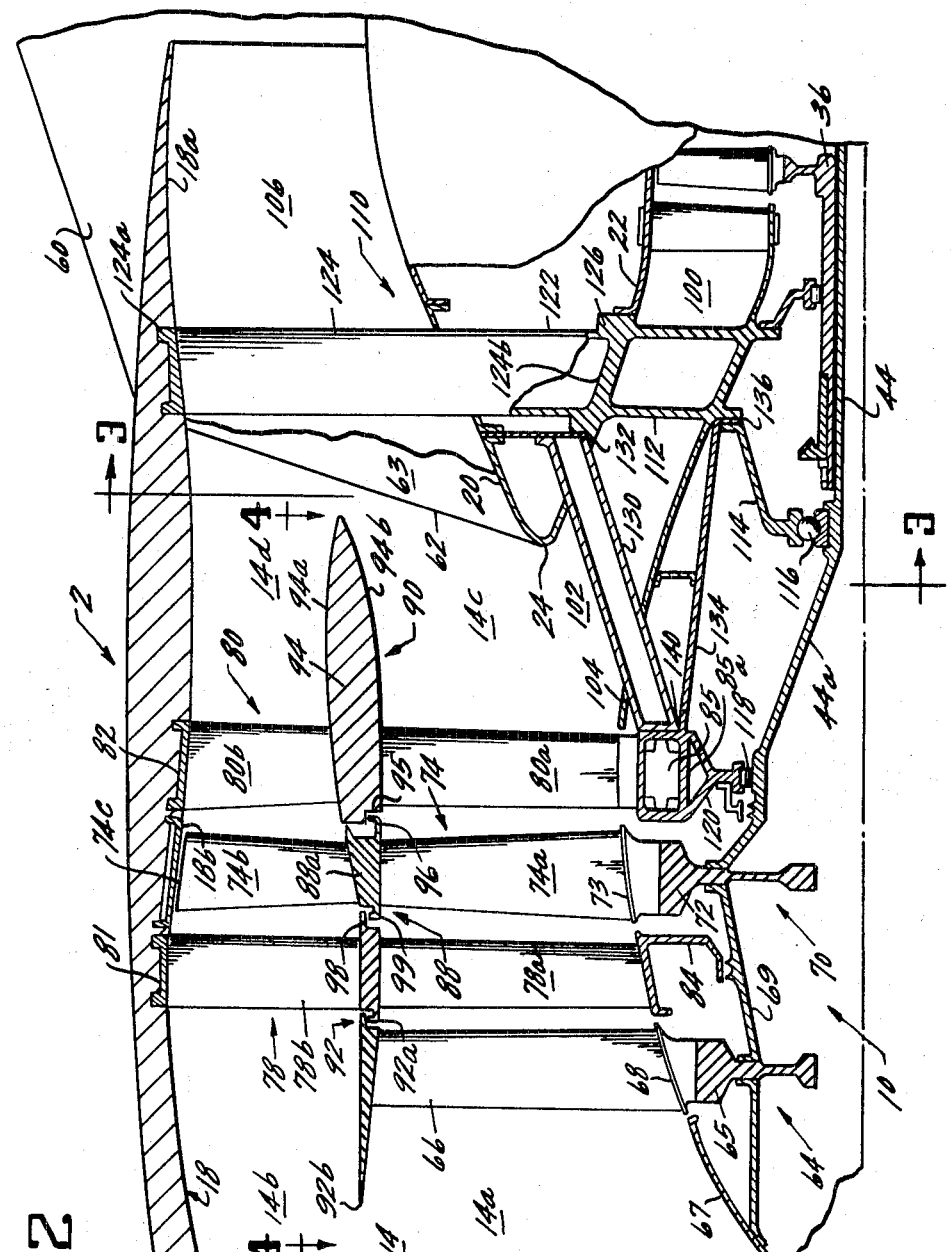

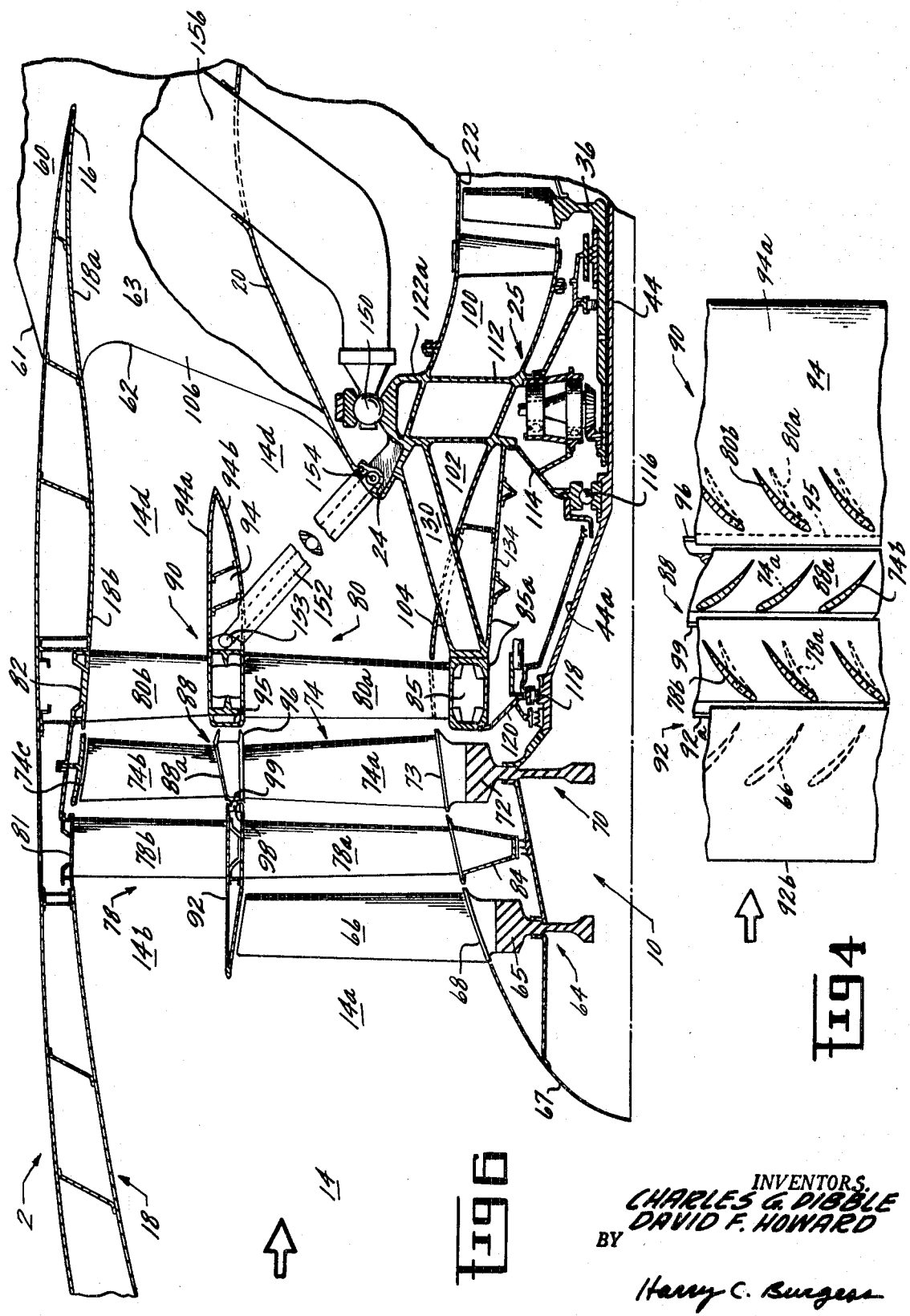

TURBOFAN TYPE ENGINE FRAME AND SUPPORT SYSTEM

The turbofan engine, as is well known to those skilled in the art, comprises a gas turbine in which air is compressed in a rotating compressor, heated in a combustion chamber, and expanded through a turbine, with part of the power output of the turbine being utilized to drive the compressor and the remainder being used to drive a fan or low pressure compressor, usually by means of a second turbine coupled thereto by a shaft. The fan is usually mounted forward of the primary components, or gas generator, in which case it is called a front fan arrangement. However, aft turbofans may also be provided in which an aerodynamically coupled turbine is used to drive the low pressure compressor. One of the measures of the efficiency of a turbofan engine is the "specific fuel consumption" (i.e., the fuel consumed in pounds per hour per pound of thrust generated by the engine). It is obvious the lower the specific fuel consumption (SFC) the more economical will be the operation of any aircraft in which the engine is used to provide the motive power. Typically most conventional turbofans are operated with bypass ratios (i.e., the ratio of the mass flow of air passing through the front (or aft) fan, as compared to the mass flow of air passing through the main gas generator) or approximately 2.0 to 1 or less. These conventional engines also currently have specific fuel consumption levels of approximately .75, and over, at cruise under normal conditions and with typical turbine inlet temperatures (1,500°—1,800°F.) in the subsonic flight regime. It can be shown that a high temperature (e.g., turbine inlet temperatures in the range 2,000°—2,400°F.), high pressure ratio (the ratio of the pressure at the outlet stage of the compressor to the inlet stage or $P_2/P_1$), high bypass ratio cycle can have a greatly improved SFC.

However, realization of the possible improvement in SFC when the engine is installed in an aircraft requires that aerodynamic drag be kept as low as possible and that the engine frontal area be minimized. Heretofore, engine designers have not been able to achieve complete success in attempting to optimize installed SFC, in the face of such requirements, whenever bypass ratios of say, 5:1, or higher, have been utilized. An improvement in installed SFC on the order of 20 percent, compared to a conventional axial-flow turbofan could be accomplished however with an improvement in front-fan design which would permit the engine frontal area, usually defined by the cowl or nacelle structure, to be held to a minimum, consistent with recognized good axial-flow compressor design practices, and thus avoid excessive external drag.

Minimum frontal area is obtained when as much frontal area as possible is utilized in conjunction with the highest possible flow velocities from the standpoint of aerodynamic efficiency. Aerodynamic considerations currently limit engine inlet designs to air flows (corrected to "standard" inlet conditions) of approximately 41 pounds per square foot of the annulus per second (as compared to a theoretical maximum of 49.5 pounds per square foot per second). Once having achieved the highest flow rate consistent with the efficiency objectives, the primary remaining design variable of any significance which can be utilized to minimize frontal area is the hub-to-tip radius ratio at inlet stage of the axial-flow fan, since this ratio will determine the percentage of the total frontal area utilized.

Obviously, maximum flow occurs where there is no appreciable hub radius. However, two major problems have existed where previous attempts have been made to utilize very low hub-to-tip radius ratios, both involving aerodynamic and mechanical considerations. For example, one mechanical problem with use of very small hubs is the difficulty of physically attaching blades where there is so little circumferential space available. This mechanical problem is aggravated because of an aerodynamic requirement of a relatively close spacing at the tip area of the row of blades in a rotor wheel. A second primary mechanical problem exists when the designer chooses to use the short chord blades typically required for lightweight components. These relatively long blades having higher aspect ratios due to the short chord introduce other problems due to a tendency to vibrate which usually has required the use of a midspan shroud to act as a dampening means. Such shrouds however, usually introduce undesirable aerodynamic flow losses in addition to increasing the overall weight of the device.

On the other hand, a fundamental aerodynamic problem occurs when blades are spaced closely at the hub when the hub's circumference is reduced to a minimum. To explain, in order to obtain adequate flow area between the individual rotor blades in such cases they must be set at an angle of attack which is usually too high from the standpoint of best aerodynamic efficiency. Most of the previous attempts, therefore, using reduced hub-to-tip ratios have been aerodynamic compromises, i.e., acceptance of lower efficiency because of too close spacing at the hub, inadequate spacing at the tip, and flow blockage losses due to the requirement for the midspan type shroud to stiffen the short chord, relatively long blades typical of such apparatus. Furthermore, overall pressure rise capability of the inlet stages of an axial-flow fan is normally limited by the capabilities of the hub area. Thus, use of a low hub-to-tip radius ratio, with minimum frontal area, has always severely compromised the capability of the inlet stages to obtain maximum energy input or pressure rise since the tip section would otherwise be capable of achieving approximately twice the pressure ratio of the hub. Thus, an improvement in turbofan engine axial-flow compressor design, particularly the front fan and associated supporting structure is required to overcome these and other basic limitations.

It would be desirable, therefore, to be enabled through improvements in the axial-flow compressor or front fan frame and associated supporting structure to facilitate the achievement of minimum frontal area for the reasons given above. This can be accomplished by proper design integration of the fan cowl both mechanically (structurally) and aerodynamically with the fan and its associated support means, to avoid unnecessary duplication of structure. A further desirable benefit from proper design integration will be the realization of reduced fan, cowl and frame loads imposed on the engine by reason of internal forces generated by normal operation of the fan and gas generator sections themselves, and by external, e.g., air gust loads, during flight.

Accordingly, a primary object of the present invention is generally to provide an integrated lightweight frame and support system for an improved axial-flow compressor design for use in a turbofan-type engine wherein reduced frontal area is obtained with flow velocities as high as practicable from an efficiency consideration.

A more specific object of the present invention is to provide an improved, lightweight, simplified fan frame and support system for use in a turbofan-type engine having a front-mounted axial-flow compressor, wherein proper design integration of the fan frame and associated support means with the fan and associated cowl and engine nacelle structures avoids unnecessary engine structural duplication and minimizes the effect of internal and externally imposed aerodynamic and mechanical loads on the fan frame and the other engine support structures.

Briefly stated, in one embodiment of our invention we provide for use in a turbofan-type fluid flow machine having a front mounted axial-flow compressor of improved design, the compressor including a first rotor wheel having hub means and a plurality of rotor blades mounted at the periphery of the hub, a second rotor wheel located downstream of the first wheel also including hub means and having a plurality of inner rotor blade means mounted at the periphery of the hub with abutting platform portions provided at the tips of the inner rotor blade means and a plurality of outer rotor blade means projecting radially from the outer surface of the platforms, a cowl coaxial with and surrounding the rotor wheels and forming a main annular passage in cooperation with the hub means for fluid flow through the compressor or fan, a row of stator vanes extending radially inwardly of the cowl intermediate the first and second rotor wheel blades and a row immediately downstream of the second rotor wheel, and contoured means affixed to the vanes and cooperating with the platforms to divide the main fan annular fluid flow passage into an inner annulus and an outer annulus, the outer annulus leading to a fan exhaust nozzle and the inner annulus to a nacelle housing a gas generator, the improvement of a lightweight frame and support system for the fan rotor and associated cowl and engine structures. The frame and support system of the invention as herein disclosed comprises means supporting the fan cowl, rotor wheels and gas generator nacelle each with respect to the other which may include in addition to the second aforementioned row of stator vanes, a plurality of radial strut portions serving as the gas generator front frame, a plurality of connecting members structurally linking the front frame struts to the second row of stator vanes and a frustoconical member axially positioned to have its upstream or larger diameter edge joined to the second row of vanes and its downstream or smaller diameter edge joined to the inner ends of the struts.

Other embodiments, objects and attendant advantages of our invention while distinctly pointed out and stated in the claims appended hereto, perhaps may be better understood by reference to the following detailed description including several drawings in which:

FIG. 1 is a horizontal view, partially cutaway and in cross section, illustrating an embodiment of the axial-flow compressor frame and associated support structure of the invention, as used in a turbofan-type engine;

FIG. 2 is an enlarged, partial, cross-sectional view illustrating a further embodiment of the improved frame structure for cantilevered support of the axial-flow fan or compressor rotor shown in FIG. 1;

FIG. 3 is a view along line 3 of the embodiment of FIG. 2;

FIG. 4 is a view along line 4 of the embodiment of FIG. 2;

FIG. 5 is a plan view looking down on the widened forward section of the pylon fairing illustrated in FIG. 2 taken at the inner surface of the fan casing or cowl; and FIG. 6 is a further embodiment of an overall fan frame and supporting arrangement for the turbofan engine illustrated in FIG. 1 as incorporated in the present invention.

Turning now more specifically to the drawings, indicated generally by numeral 1 in FIG. 1 is an aircraft gas turbine engine. The engine includes a relatively short (in the axial direction) fan cowling or stator casing 2, a hollow annular nacelle or gas generator pod 3—partially telescoped by the cowl member—and a rearwardly located plug member 4. Each of the aforementioned structures are generally symmetric about a plane through the engine axis. The engine is an axial-flow turbofan having a forwardly located compressor or fan, indicated generally at 10, of improved design. The fan 10 which will be more fully described hereinafter together with the other components of the engine, provides improved operating results as compared to engines of the prior art. The fan is adapted to receive air through the primary engine inlet indicated at 12 and is operable to generate a relatively high volume, low pressure gas stream in a main annular flow passage defined by the stator casing 2 and generally indicated at 14. The major portion of the fan flow exits through a first annular exhaust nozzle opening 16 formed by the inner surface or wall 18 of cowling 2 and the outer surface 20 of the second casing or pod means, indicated generally at 3. The second or gas generator casing also includes an inner wall 22 joined to the casing outer wall at 24, the inner wall defining a central flow passage 25 in the second casing in which is disposed the gas generator, indicated generally at 28. The gas generator includes a compressor 30, combustion means 32 and turbine means 34. This will be recognized by those skilled in the art as being the conventional turbojet arrangement with turbine 34 being drivingly connected to the compressor 30 by an outer shaft 36. The central flow passage 25 defined by the inner casing wall 22 includes a rearward area 38 which directs the hot gas stream from the gas generator through a prime mover or multistage turbine, indicated generally at 40. After passing through the multistage fan turbine 40, the gas—cooled by the extraction of work to drive the fan 10—exits through a second annular exhaust nozzle 42 in the turbofan engine defined by the inner pod wall 22 and the plug member 4. The multistage turbine 40 drives the axial-flow compressor 10 through means of an elongated shaft 44 coaxially located within the gas generator shaft 36. A plurality of frame members are provided at 46, 48 and 50, respectively, to provide support for the rotating shafts of the turbofan engine in the conventional manner through bearing means indicated at 52, 54 and 56, also respectively. In addition, the turbofan engine of FIG. 1 is adapted to be supported from an aircraft (not shown) wing or fuselage by means of a pylon, indicated generally at 60. The pylon comprises an outer aerodynamically shaped, in cross section fairing 61, the fairing having a forwardly located edge at 62 including a thickened portion, indicated generally at 63 for the purpose of reducing flow losses, as described hereinafter in more detail.

An important aspect of the turbofan engine is the design of the axial-flow compressor or fan indicated generally at 10. Referring to FIGS. 2 or 6, it will be seen that the axial-flow compressor 10 comprises a first rotor wheel indicated generally at 64, having a hub or peripheral portion 65 from which projects a plurality of radially extending rotor blades 66. A forward hub fairing or bullet nose 67 is utilized in conjunction with the first rotor wheel hub means to provide a smooth entry into and through the first rotor wheel or stage 64. The peripheral surface 68 of the hub portion 65 between the blades 66 will form a smooth continuation of the hub fairing 67 so as to complete the inner flow path boundary wall into the first rotor stage. Continuing with the description of our novel axial-flow compressor design, the first rotor wheel is connected by a generally cylindrical spacer 69 to a second rotor wheel, indicated generally at 70. Like the first wheel, the second wheel 70 includes hub means 72 having a peripheral surface 73 from which project a plurality of rotor blades, indicated generally at 74. As in the first stage, the peripheral surface 73 between the blades continues the smooth inner flow path boundary wall of the compressor. The stator casing defining the annular passage 14 includes a first plurality of stator vanes, indicated generally at 78, located intermediate to the first and second stage rotor wheels, and a second plurality of stator vanes, indicated generally at 80, located immediately downstream of the second rotor wheel. The stator vanes extend radially inward from the inner surface 18 of the casing being rigidly attached at their outer ends at 81 and 82, respectively, to the casing in a known manner. At the inner ends of the stator vanes of the first and second pluralities, respectively, there are provided shroud means 84 and 85, which are configured to provide a continuation of the peripheral surfaces of the hub means at 68 and 73 of the first and second rotor wheels, respectively, to complete the inner flow path boundary wall of the bladed portion of the compressor 10.

Turning now, more specifically, to a description of the second rotor wheel blades, the arrangement is unusual in that it comprises a "fan-on-fan" blade or a "cofan". Thus, each blade 74 is actually two compressor blades, i.e., an inner compressor blade portion 74a and an outer compressor blade portion 74b. The two compressor blade portions are separated by an integral platform or shroud member, indicated generally at 88, of unusual design. This rotating shroud member 88, as shown in FIG. 4 in plan view, comprises a portion of a contoured flow-splitter, indicated generally at 90, which divides the annular flow passage 14 into an inner annulus 14a and an outer annulus 14b. As seen in FIG. 4, the annular member or flow-splitter 90 comprises, in addition to the rotating blade platform portions 88, a forwardly extending portion indicated generally at 92, having a first section 92a affixed to the first plurality of stator vanes and a second portion 92b extending forwardly of the first section. The flow-splitter member also includes a rearwardly located stationary member 94 affixed to the second plurality of stator vanes. The annular stationary member 94 includes an outer surface 94a and an inner surface 94b contoured so as to provide minimum flow losses in the overall fan stream, as hereinafter explained. Member 94 may be notched as at 95 to provide a surface for a radial seal 96 integral with the platform 88. Likewise the rear surface of the flow-splitter portion 92 can be notched at 98 to provide a similar surface for a front radial seal 99. As shown in FIGS. 2 and 4, the portions 92a and 92b of the flow-splitter are affixed to the stator vanes 78 and the rotor blades 66, respectively. However, portions 92a and 92b could comprise a single integral structure 92 in a surrounding relationship to the first row of rotor blades 66 to facilitate manufacturing and service.

As stated previously, there are a number of aerodynamic and mechanical problems to be solved in the design of such an axial-flow compressor, e.g., the difficulty of attaching blades to a hub when there is little circumferential space available (blade solidity problem), an aerodynamic requirement of relatively close blade spacing at the tip area, and vibration problems associated with relatively long, short-chord (high aspect ratio) blades. The axial-flow compressor just described overcomes these and other problems by use of the partial or "half" stage indicated at 64 at the inlet of the fan 10. Further, the main fan flow path 14 is divided into the two annular compressor passages 14a and 14b and the two outlet or transition passages 14c and 14d, respectively. The outer annulus is designed to pass approximately the same mass flow in a single stage comprising rotor blade means 74b and inlet guide or stator vanes 78b as the inner annulus, wherein the inner portion of a "second" rotor stage is supercharged by the "first" or "half" stage 64. This arrangement permits a lower rotating speed in the inner compressor to pump the same pressure ratio as the outer compressor. After passing through the outlet guide or stator vanes 80 the inner and outer annulus flows are transitioned to the fan exhaust nozzle 16 and the gas generator inlet area, indicated generally at 100. Thus, flow through the inner annulus 14a is split by the forward portion 24 of the second casing means or pod 3 with the outer wall 20 of the casing and a rear portion 18a of the inner surface of the cowling 18 forming a transition zone 106—to the rear of zones 14c and 14d—leading to the annular exhaust nozzle 16. As seen in FIGS. 1 and 2, a portion of the flow of the inner annulus is directed through another rearward transition passage 102 formed by the inner second casing wall 22 and a third wall member 104 which forms a smooth continuation of the hub means of the rotor wheels and the stator shrouds. This arrangement provides a very high bypass ratio turbofan engine wherein approximately 85 percent of the total thrust of the engine is provided by the fan stream. One side benefit of this is the fact that needed thrust reversal may be provided by reversing only the fan stream.

The axial-flow compressor or "1½" stage fan arrangement as herein disclosed has a number of aerodynamic and mechanical advantages over the prior art designs. For example, the arrangement provides a gas turbine compressor having a reduced hub diameter and reduced hub speed for a given pressure rise or energy input across the compressor, as compared to the known axial-flow single stage or two-stage compressor designs for turbofan-type engines having an equivalent frontal flow area. Further, as compared to any single stage or the first stage of a conventional two-stage fan arrangement the "second" stage rotor blade 74 will be shorter in length. In other words, the ratio of the radius of the hub (at 73) of the "second" rotor wheel stage to the diameter of the tip portion 74c of the blades 74, as compared to the known arrangements of axial-flow fan design, will be much greater than would otherwise be the case. This is possible primarily because the inner flow path 14a at the second stage is supercharged by the first or "half" stage rotor blades 66 and therefore the fluid flow therein has higher pressure and density and lower volume than would normally be the case. This, in turn, enables better blade spacing and blade solidity from an aerodynamic and mechanical standpoint. In other words, the outer portion 74b of the second stage rotor will have an energy input capability equal to the energy input in the two stages of the inner flow path 14a. The diameter of the hub 88a of this "second" stage is greater and thus operates at an equivalent wheel speed, so that the outer portion of what would otherwise be a complete "first" stage blade is eliminated without compromising the work capacity of the "1½" stage fan. Thus, the length of the blading in the "first" stage is substantially reduced (by the elimination of the outer portion) with unique and unusual benefits in both structural lightness of the fan, very high flow capacity for a minimum frontal area, simplified mechanical design (shorter blades, lower stresses, less vibration) and fewer aerodynamic compromises than in a conventional fully extended rotor blade stage.

With the above described arrangement it may also be perceived that there are no "midspan" shrouds as these are typically known and used in the prior art, as shown in many patents (e.g., U.S. Pat. No. 2,772,854). That is to say, portions 88, 92 and 94 of flow-splitter 90 actually constitute a part of the flow path boundary walls for the inner and outer annulus. Thus, they form an integral part of the wall means or casings which define the compressor flow paths and are not located directly in the path of the fluid in either the inner or the outer annulus and, therefore, do not cause flow blockage losses in these paths, in and of themselves. In addition, by suitably contouring the rear surfaces of the stationary member 94 a higher pressure ratio may be achieved in the outer annulus and possibly the inner annulus, as well. In other words, the flow-splitter outer walls 94a and 94b are so designed as to result in a flow blockage substantially larger at the exit area of rotor wheel 70 than at the inlet. This permits the flow annulus area requirements to be met without excessive tip slope, as described above, which has aerodynamic advantages with respect to such problems as tip clearance and efficiency, as also explained above. This provision of a combination contoured flow-splitter blade dampening means integral with the flow path boundary walls, therefore, provides more effective aerodynamic use of the outer portion of the second stage rotor blade means 74b, more effective dampening and vibration resistance for better aeromechanical blade stability, as well as a mechanism for resisting blade twisting and movement tendencies during aircraft maneuvering without causing undesirable flow distortion such as accompanies the use of the conventional midspan shroud or other devices, e.g., radial blade pins, etc., which block or otherwise directly impede flow in the primary compressor annulus.

Another consideration is improvements in the design of the transition areas behind the fan 10. It is known that a high bypass ratio fan design will lead to a severe difference in the hub diameter between the fan and the gas generator. As described above, in the present design this difference is minimized by the very low inlet hub-to-tip radius ratio (e.g., .27 as compared to .35 in a conventional engine) provided by the "1½" stage axial-flow compressor. Thus, by suitably contouring the flow-splitter walls and arranging for flow through the transition areas 106 and 102 to be unimpeded during "normal" flight conditions, flow (pressure) losses through the entire engine can be minimized. In other words, the inner transition area 102 is sized and contoured to provide just enough flow to be accepted by the gas generator 32, and the streams from transition areas 14c and 14d are blended into a single discharge flow through transition area 106 with precisely the right amount of convergence to avoid "choking" (or other undesirable aerodynamic effects) ahead of the annular exhaust nozzle opening 16.

Other benefits are provided by the unusual design of the fan 10. For example, due to the reduced tip speed of the supercharging inner stage 64 resulting from its reduced diameter there is no need to provide an inlet guide (stator) vane forward of the first rotor wheel to avoid excessive Mach numbers relative to the rotor blade. This, of course, reduces the overall weight of the engine in addition to making it more efficient. Also, there is no need to provide anti-icing for the "first" stage since the pressure rise is such that the temperature rise is sufficient to keep ice from forming excessively. Thus, in the above described arrangement only the outer half 78b of the plurality of the stator vanes 78 need be provided with anti-icing air, through the outer ends of the hollow vanes, for example, which allows more motive fluid to be used to produce thrust than would normally be the case if both stages had to be supplied with anti-icing air.

In summary, the axial-flow compressor or front fan 10 utilizes two annular flow passages—the outer half passing approximately one-half of the total flow in a single stage design having a tip wheel speed (corrected to standard temperature) of approximately 1,500—1,600 feet per second and having anti-iced inlet guide vanes, whereas the inner half of the fan annulus 14, is a two-stage design with a tip wheel speed of approximately 1,000—1,100 feet per second and not requiring inlet guide vanes. This "1½" stage arrangement thus permits a lower rotating speed in the inner half to pump the same pressure ratio as the outer half (approximately 1.55:1 under cruise conditions). In addition, improved flow transitioning in a turbofan-type engine is provided, wherein a portion of the inner annulus flow is branched off to enter the gas generator mounted in a second casing which projects partially at 24 into the overall or main annular flow path 14, defined by the casing, indicated generally at 2 in FIG. 1. This arrangement offers advantages over both the conventional single stage and the two-stage designs in that utilizing a "double" stage at the hub of the fan permits having a very low overall hub-to-tip radius ratio of approximately .25 to .27 (for design with a radius ratio of .36 for both the half stage and full stage) which results in a reduction of the fan blade tip diameter for the same pumping capacity and speed—when compared to the conventional designs—of approximately 3 percent compared to a two-stage design with a radius ratio of .36 and 14 percent compared to a single-stage design with a radius ratio of .5. Thus, compared to a two-stage compressor of the same radius ratio and pressure ratio our "1½" stage design is much lighter, more efficient and has less losses at the tip area, in addition to not requiring anti-icing for the inner "two-stage" flow path. Finally, a reduction in the overall size of the fan turbine is permitted due to the higher shaft speeds at which the "1½" stage axial-flow fan is permitted to run, as compared to what is normally the case.

An important feature of our invention is an improved structural fan frame and supporting arrangement for the rotor of the axial-flow compressor or fan 10 and other components of the engine. Thus, in addition to the aforementioned frames 46, 48 and 50 and the pylon structure, the second plurality of stator vanes 80 may also be utilized to provide support for the cowling or fan duct member 2. Thus, as seen in FIGS. 2 and 6 the vanes 80 may be ruggedized, i.e., made much stronger structurally in comparison to a conventional stator vane, by thickening the walls or by inserts in the hollow vanes, for example, especially in the area of the inner shroud 85 which functions, as stated above, as a continuation of the hub means providing a smooth inner flow path boundary wall in the fan are the stator vanes stronger than is normally the case. The shroud 85, therefore, rather than being of lightweight fabricated design, as is conventional, comprises a relatively heavy cast or forged ring member 85a or box which operates in conjunction with the stator vanes 80 to provide additional support, as now described. Turning to the embodiment of FIG. 2, it will be seen that there is provided a plurality of strut means, indicated generally at 110. Strut means 110 includes a plurality of inner radially extending portions 112 projecting across the inlet area 100 to the gas generator 28. The inner ends of the strut means provides support, through suitable flange members indicated at 114, for bearing means indicated at 116 which, in this case, will be of the ball type. In other words, bearing 116 will take the thrust of the axial loads imposed thereon by the axial-flow fan or compressor 10. In addition, fan shaft 44 has an extension at 44a which rides on a second, or roller-type bearing means 118. This bearing is supported by a conical flange member or extension 120 of the inner shroud ring 85. A portion 122 of strut means 110 is buried within the front portion 24 on the casing or pod 3. Extending outwardly of the pod, i.e., across the fan exhaust passages 14c and 14d are a plurality of V-shaped outer portions 124 of strut means 110. As seen perhaps more clearly in FIG. 3, the outer V-shaped portions are inverted in the sense that the apex of the V connects to the inner surface 18 of the fan cowl 2 at 124a, whereas the spaced or open ends pass through the outer wall portion 20 of the pod to join the outer ends of the inner strut portions 112. A circumferential casting 126 may be provided at this point to strengthen the juncture of the V-shaped portions with the inner strut portions 112 of strut means 110 adjacent the inner wall 22 of the pod or gas generator nacelle 3. The inverted V-shaped arrangement can be provided to withstand extreme twisting or gust loads caused by the force of air acting on the outer surface of the fan cowling 2 during aircraft maneuvers or as a result of unusual level flight conditions during cruise.

A further portion of our fan frame and support structure for the axial-flow compressor comprises a plurality of circumferentially spaced link members 130 that extend from the stator hub 85 across the transition zone 102 to the outer ends of the inner strut portions 112 to be affixed thereto by an annular gusset or plate at 132. If desired, front frame members or inner strut portions 112 and link members 130 may be joined integrally in the form of a ribbed, triangular shaped plate. In such case, the area of the transition zone 102 between 130 and 112 will be filled in. In either case, the frontal view will appear as indicated in FIG. 3. Finally, a lightweight, thin-walled frustoconical member will be provided at 134 which is attached to the inner ends of the inner portions 112 of strut means 110 at 136, with the forward or larger diameter edge of the frustoconical member being rigidly affixed to the hub means 85 at 140.

Thus, it will be seen that in the above described embodiment the engine has an unusually lightweight, rugged fan frame support structure acting to locate, each with respect to the other, the forward stator vane and casing duct structure, the pod or nacelle structure 3 and the "1½" stage fan rotor. The support structure preferably includes as an integral part thereof the rear stator vanes 80, each of which may be heavier and or a portion only thereof intermediately spaced about the axis of the engine, for some additional lightening of the structure. The basic structure, in other words, comprises a radial strut gas generator front frame (inner strut portions 112), a frustoconical member 134 extending from the inner ends of the struts to the stator hub 85, and the link members 130 extending from the outer ends of the strut portions 112 to the stator hub, in combination with the stator vanes 80. The structural portions 130 and 112 may or may not be integrated as stated above. The structure is further stabilized and made staunch by use of substantial castings, plates, or forgings, such as indicated at 126 and 132, as well as the aforementioned ruggedized stator vane hub means 85. This arrangement provides minimum bending with all major loads in tension and compression. Further, due to the location of the frame and the fact that the axial-flow fan rotor wheels 64 and 70 are cantilevered therefrom, the frame is of smaller diameter than would otherwise be the case. This will provide the least weight for the most strength, in comparison to known turbofan-type engine frames. As described above, the outer portions 124 will be V-shaped (although they might consist of merely radial extensions of the inner portions 112) to provide additional rigidity since they will react outer cowling, axial, radial and tangential loads imposed directly onto the engine mounts at 150 and at the rear frame 48 as indicated in FIGS. 1 and 6.

Turning now to FIGS. 1 and 6, the forwardly canted struts 152 are an alternate embodiment of our improved support structure. Struts 152 can eliminate the need for strut means 124, although in each case the struts are preferably of the inverted V-shape. The advantage of the inverted V-shape is that it provides the structure to take tangential loads in tension or compression, rather than bending, in the relatively long, thin members 124. It should also be noted that in the FIG. 2 embodiment, members 124 are located in a radial plane substantially downstream of the radial plane of the airfoil members 80. The advantage of this arrangement is that it maximizes the moment arm between the primary casing load points at the outer ends 82 of stator vanes 80 and at the strut apex 124a in the embodiment of FIG. 2. In either arrangement, the outer strut portions 124 or 152 facilitate taking the cowl gust and maneuver loads while ensuring primarily tensile and compressive loads in the structural members, rather than bending loads. Struts 152 or 124 may also be canted rearwardly, however, to further facilitate the reduction or elimination of undesirable loads, in which case in the FIGS. 1 and 6 embodiment they would also be in the 12 o'clock position (see FIG. 3) when covered by the pylon.

As shown in FIG. 6 the canted struts 152 may be pivotally connected at 153 and 154 to the contoured flow-splitter 90 and casing or nacelle nose 24, respectively, to further eliminate or reduce undesirable loads. If desired, further strengthening of the support provided by the members 152 of our improved lightweight frame and supporting structure may be accomplished by adding an outer radially extending structural portion to members 152. These could be located immediately aft of stator vane portions 80b, or integral therewith (e.g., inserts in the hollow vanes).

In summary, the basic frame structure supports the axial-flow compressor rotor wheels in a cantilevered configuration with roller-type bearing means 118 inwardly of the stator hub 85 and thrust-type bearing means 116 inwardly of strut means 110. The bearing loads are, then, transmitted only through what may be termed a simplified "base" structure comprising inner strut means 112, the members 130 (which may be integral with members 112), the frustoconical member 134 with the addition of ruggedized vanes 80. The invention has the further advantage that the front mount (see FIG. 6) for the gas generator, and its casing also, may be positioned rearwardly of the axial-flow compressor 10 and slightly forwardly of the gas generator, which has the effect of decreasing the overall weight of the arrangement due to the reduced engine diameter at this point. Finally, use of the second plurality of stator vanes 80 (primarily aerodynamic members) as an integral part of the frame structure can eliminate the need for an additional frame or support member.

Another aspect of the invention is the provision for broadening a portion, indicated generally at 63, of the pylon to enable it to fit over the V-shape strut means 124, where provided, at the 12 o'clock position, as shown in FIG. 3. This broadened or thickened portion varies in thickness and contour from the front to the rear through the transition passage 106. The effect of this unusual contouring of the outer fairing is to minimize flow losses through the transition zone 106 to the annular exhaust nozzle 16, i.e., all flow upstream of the exit plane of the nozzle will not be permitted to exceed Mach 1.0 (sonic) in any portion of the fan exhaust nozzle annulus.

It is understood that the invention is not limited solely to the embodiments shown and described and that such other modifications and changes thereto as are within the skill of the art are intended to be included within the scope of the appended claims thereto.

We claim:

1. For use in a turbofan-type engine including an axial-flow compressor having first and second bladed rotor wheels, stator means including a casing surrounding said wheels and a row of stator vanes intermediate the rotor wheels, second casing means coaxial with and partially telescoped at the forward end thereof by said stator casing, said second casing means having a central flow passage therethrough including a gas generator disposed therein, improved means for supporting said engine casings and said rotor wheels each with respect to the other including:

a plurality of radially extending circumferentially spaced airfoil-shaped members extending inwardly of the stator casing immediately downstream of the second rotor wheel;

a plurality of circumferentially spaced connecting means including inner strut portions extending radially across the inlet to the gas generator, said inner strut portions providing a front frame for said gas generator and supporting the gas generator within the second casing;

a plurality of outer strut members circumferentially spaced about the engine axis, said outer strut members operably connecting the airfoil-shaped members to the outer ends of the inner strut portions;

a frustoconical member having its upstream edge connected to the inner ends of said airfoil-shaped members and its downstream edge connected to the inner ends of said inner strut portions; and bearing support means joined, respectively, to the juncture of said airfoil-shaped members and said frustoconical member, and to the inner ends of said inner strut portions, whereby the rotor wheels are cantilevered from said supporting means and both external and internal mechanical and aerodynamic loads imposed on said casings are minimized.

2. The apparatus as described in claim 1 wherein said airfoil-shaped members comprise a row of outlet guide vanes for the axial-flow compressor.

3. The apparatus as described in claim 1 wherein said circumferentially spaced connecting means includes a plurality of link members connecting the outer ends of said inner strut portions to the inner ends of said airfoil-shaped members.

4. The apparatus as described in claim 1 wherein said outer strut members comprise a plurality of aerodynamically shaped members connected to the second casing means adjacent the outer ends of the inner strut portions, said members extending forwardly and at an angle with respect to the engine axis and being operably connected to the airfoil-shaped members approximately at the midpoint of their radial lengths.

5. The apparatus as described in claim 4 wherein said aerodynamically shaped members are pivotally connected at the ends thereof to said airfoil-shaped members and said casing means, respectively.

6. A turbofan-type fluid-flow machine including:
an axial-flow compressor comprising;
a first rotor wheel including hub means having a plurality of rotor blades mounted at the periphery thereof;
a second rotor wheel downstream of said first wheel and including hub means having a plurality of inner rotor blade means mounted at the periphery thereof, abutting platform portions on the tips of said second rotor blade means forming an annular rotating member, and a plurality of outer rotor blade means projecting radially from the outer surface of said annular rotating member; and
stator means including a casing coaxial with and surrounding said rotor wheels and forming a main annular passage in cooperation with said hub means for fluid-flow through the compressor, and a first plurality of stator vanes extending radially inwardly of said casing intermediate the first and second rotor wheel blades;
means dividing said main annular fluid-flow passage into an inner annulus and outer annulus, said flow-dividing means including a stationary annular member affixed to said first plurality of stator vanes in the radial location of said annular rotating member so as to form a forwardly extending continuation thereof;
second casing means coaxial with said stator casing, said second casing means having an outer wall and an inner wall joined at the forward end of said second casing, said outer wall cooperating with the inner surface of the stator casing to form an outer rearward transition passage in said main annular passage terminating in an annular exhaust nozzle opening at the downstream end of said stator casing, said inner wall providing a central flow passage boundary wall within said second casing means terminating in a second exhaust nozzle opening substantially downstream of said stator casing exhaust opening;
a gas generator disposed within said central flow passage;

third wall means disposed inwardly of said second casing inner wall, said third wall means forming a smooth continuation of said second hub means and cooperating with said casing inner wall to form an inner transition passage adapted to direct at least a portion of the flow from said inner annulus to an inlet area of said gas generator;

prime mover means disposed in said central flow passage downstream of said gas generator and drivingly connected to said axial-flow compressor; and means supporting said casings, said rotor wheels, and said third wall means each with respect to the other, said supporting means including;

a plurality of circumferentially spaced radially-extending airfoil-shaped members located immediately downstream of said second rotor wheel and including a stationary annular member in said radial location forming an aft continuation of said annular rotating member;

a plurality of circumferentially spaced connecting means including inner strut portions extending radially across said inlet area, said strut portions providing a front frame for said gas generator, and supporting said gas generator within said second casing;

a plurality of outer strut members circumferentially spaced about the engine axis, said outer strut members operably connecting the airfoil-shaped members to the outer ends of said inner strut portions adjacent said second casing inner wall;

a frustoconical member having its upstream edge joined to the inner ends of said airfoil-shaped members and its downstream edge joined to the inner ends of said inner strut portions; and bearing support means joined, respectively, to the juncture of said airfoil-shaped members and said frustoconical member, and to the inner ends of said inner strut portion, whereby said first and second rotor wheels are cantilevered from said supporting means with said blades of said first rotor wheel and said inner rotor blade means of said second wheel extend radially across said inner annulus only and said outer rotor blade means of said second wheel extend radially across said outer annulus only.

7. The apparatus according to claim 6 wherein the bearings located adjacent the inner ends of said airfoil-shaped members and the bearings located adjacent the inner strut portion inner ends comprise, respectively, roller-type bearings and thrust-type bearings and wherein said outer strut members comprise V-shaped members extending across said outer annulus and being joined at the apex of the V to the compressor casing, the circumferentially spaced inner ends of adjacent V-shaped members being joined to the outer ends of said inner strut portions adjacent said outer wall of said second casing means.

8. In an aircraft:

a pylon attached at one end to said aircraft, said pylon including an outer fairing generally aerodynamically shaped in cross section and having at least a portion of its leading edge adjacent the other end of the pylon widened in cross section with respect to the remainder of said fairing; and an axial-flow compressor comprising:

a first rotor wheel including hub means having a plurality of rotor blades mounted at the periphery thereof;

a second rotor wheel downstream of said first wheel and including hub means having a plurality of inner rotor blade means mounted at the periphery thereof, abutting platform portions on the tips of said inner rotor blade means forming a rotating annular member, and a plurality of outer rotor blade means projecting radially from the outer surface of said annular member; and a stator means including a casing coaxial with and surrounding said rotor wheels and forming a main annular passage in cooperation with said hub means for fluid-flow through the compressor, a first plurality of stator vanes extending radially inwardly of said casing intermediate the first and second rotor wheel blades, and a second plurality of stator vanes extending radially inwardly of said casing immediately downstream of said second rotor wheel;

means dividing said main annular fluid-flow passage into an inner annulus and outer annulus, said flow-dividing means including stationary annular members affixed to said first and said second plurality of stator vanes in the radial location of said rotating annular member so as to form fore and aft continuations thereof;

second casing means coaxial with said stator casing, said second casing means having an outer wall and an inner wall joined at the forward end of said second casing, said outer wall cooperating with the inner surface of the stator casing to form an outer rearward transition passage in said main annular passage terminating in an annular exhaust nozzle opening at the downstream end of said stator casing, said inner wall providing a central flow passage boundary wall within said second casing means terminating in a second exhaust nozzle opening substantially downstream of said stator casing exhaust opening;

a gas generator disposed within said central flow passage;

third wall means disposed inwardly of said second casing inner wall, said third wall means forming a smooth continuation of said second hub means and cooperating with said casing inner wall to form an inner transition passage adapted to direct at least a portion of the flow from said inner annulus to an inlet area of said gas generator;

prime mover means disposed in said central flow passage downstream of said gas generator and drivingly connected to said axial-flow compressor; and means supporting said casings, said rotor wheels, and said third wall means each with respect to the other, said supporting means comprising:

a plurality of strut means including radially extending inner portions projecting across said gas generator inlet area and V-shaped outer portions projecting across main annular fluid-flow passage, said V-shaped portions being operably connected at the apex thereof to said second plurality of stator vanes adjacent said flow-dividing means, with adjacent spaced inner ends of the V-shaped portions being joined together adjacent the second casing outer wall to the outer end of one of said inner strut portions;

an annular shroud member joining the inner ends of said second stator vanes;

a plurality of link members circumferentially spaced about the engine axis and extending at an angle with respect thereto and connecting said shroud member to said inner strut portion outer ends adjacent said second casing inner wall;

a frustoconical member having its larger diameter upstream edge joined to said shroud member and its downstream smaller diameter edge joined to the inner ends of said inner strut portions; and bearing support means located, respectively, at the juncture of said second stator vane shroud member, said link members, and said frustoconical member, and at the juncture of the inner ends of said inner strut portions and said frustoconical member, whereby said first and second rotor wheels are cantilevered from said supporting means with the blades of said first rotor wheel and said inner rotor blade means of said second wheel extending radially across said inner annulus only, and said outer rotor blade means of said second wheel extending radially across said outer annulus only, and whereby said widened pylon fairing portion encloses at least one of said outer V-shaped strut portions to minimize flow blockage losses in said outer annulus.